United States Patent
Chiba et al.

(10) Patent No.: US 11,332,558 B2
(45) Date of Patent: May 17, 2022

(54) WATER-ABSORBENT RESIN, AND SOIL

(71) Applicant: SUMITOMO SEIKA CHEMICALS CO., LTD., Kako-gunHyogo (JP)

(72) Inventors: Mikito Chiba, Himeji (JP); Yuichi Onoda, Himeji (JP)

(73) Assignee: SUMITOMO SEIKA CHEMICALS CO., LTD., Hyogo (JP)

(*) Notice: Subject to any disclaimer, the term of this patent is extended or adjusted under 35 U.S.C. 154(b) by 480 days.

(21) Appl. No.: 16/490,347

(22) PCT Filed: Mar. 2, 2018

(86) PCT No.: PCT/JP2018/007962
§ 371 (c)(1),
(2) Date: Aug. 30, 2019

(87) PCT Pub. No.: WO2018/159803
PCT Pub. Date: Sep. 7, 2018

(65) Prior Publication Data
US 2020/0002445 A1 Jan. 2, 2020

(30) Foreign Application Priority Data
Mar. 2, 2017 (JP) .............................. JP2017-038982

(51) Int. Cl.
*C08F 20/06* (2006.01)
*E02B 3/04* (2006.01)
*B01J 20/26* (2006.01)
*B01J 20/28* (2006.01)

(52) U.S. Cl.
CPC ............... *C08F 20/06* (2013.01); *E02B 3/04* (2013.01); *B01J 20/261* (2013.01); *B01J 20/28019* (2013.01)

(58) Field of Classification Search
CPC . C08F 20/06; E02B 3/04; B01J 20/261; B01J 20/28019
USPC ........................................................ 502/402
See application file for complete search history.

(56) References Cited

U.S. PATENT DOCUMENTS

| | | | |
|---|---|---|---|
| 5,180,798 A | 1/1993 | Nakamura et al. | |
| 2003/0018115 A1 | 1/2003 | Massey et al. | |
| 2009/0281247 A1 | 11/2009 | Handa et al. | |
| 2011/0313113 A1 | 12/2011 | Sakamoto et al. | |
| 2013/0101851 A1 | 4/2013 | Takaai et al. | |
| 2013/0158495 A1 | 6/2013 | Handa et al. | |
| 2014/0296465 A1 | 10/2014 | Sakamoto et al. | |
| 2015/0158015 A1 | 6/2015 | Tanimura et al. | |
| 2018/0001300 A1 | 1/2018 | Nakatsuru et al. | |
| 2020/0001270 A1 | 1/2020 | Chiba et al. | |
| 2020/0009528 A1 | 1/2020 | Chiba et al. | |

FOREIGN PATENT DOCUMENTS

| | | |
|---|---|---|
| EP | 1 637 105 A1 | 3/2006 |
| EP | 1 374 919 B1 | 10/2010 |
| GB | 2 267 094 A | 11/1993 |
| JP | S61-169509 A | 7/1986 |
| JP | H03-227301 A | 10/1991 |
| JP | 2003-290290 A | 10/2003 |
| JP | 2003-301436 A | 10/2003 |
| JP | 2006-342306 A | 12/2006 |
| JP | 2007-154350 A | 6/2007 |
| JP | 2008-201811 A | 9/2008 |
| JP | 2012-012482 A | 1/2012 |
| JP | 2013-199444 A | 10/2013 |
| JP | 2014-098172 A | 5/2014 |
| JP | 2015-083757 A | 4/2015 |
| JP | 2015-194054 A | 11/2015 |
| JP | 2010-255346 A | 11/2020 |
| WO | WO 2012/002455 A1 | 1/2012 |
| WO | WO 2016/111223 A1 | 7/2016 |

OTHER PUBLICATIONS

International Search Report for International Application No. PCT/JP2018/007962, dated June 5, 201 (in 2 pages).
Extended European Search Report, European Patent Application No. 18761562.0 dated Nov. 4, 2020.
Japanese Office Action in Japanese Patent Application No. 2019-503143 dated Oct. 12, 2001.
Third Party Submission filed toward the counterpart European Patent Appln. No. 18761562.0 (Notification Date: Mar. 22, 2022) (6 pages).
Shimadzu Corporation, "Observations of Superabsorbent Polymers Using the inspeXio SMX-100CT Microfocus X-Ray CT System", 2013 (2 pages).
Board of Appeal of the European Patent Office Data sheet for the Dec. 15, 2003 Decision of Appeal, in European Application No. 92115510.7 (1 page).
Buchholz, Fredric L., et al., Modern Superabsorbent Polymer Technology 1988 (23 pages).
Sumitomo Seika Chemicals Co., Ltd., Aqua Keep Brochure, Apr. 30, 2014 (8 pages).

*Primary Examiner* — Edward M Johnson
(74) *Attorney, Agent, or Firm* — Knobbe, Martens, Olson & Bear, LLP (57) ABSTRACT

Provided is a water-absorbent resin that quickly absorbs water, even in sandbag in which a large amount of the water-absorbent resin has been used, that does not easily form unswollen lump, and that has a high gel swelling volume when water is used to swell the water-absorbent resin. This water-absorbent resin is configured from a polymer of water-soluble ethylenic unsaturated monomers. The physiological-saline absorption capacity of the water-absorbent resin is 40-60 g/g. When a cross-sectional image of the water-absorbent resin is observed by x-ray computed tomography, the fraction of the area of the cross-sectional image that is hollow portions (the hollow area ratio of the cross-sectional image), as calculated on the basis of formula (I), is no more than 10%. (I) Hollow area ratio [%]={total cross-sectional area (B) of hollow portions of the water-absorbent resin/(total cross-sectional area (A) of resin portions of the water-absorbent resin+total cross-sectional area (B) of hollow portions of the water-absorbent resin)}×100%.

13 Claims, 1 Drawing Sheet

WATER-ABSORBENT RESIN, AND SOIL

TECHNICAL FIELD

The present invention relates to a water-absorbent resin; more particularly, the present invention relates to a water-absorbent resin suitably used for sandbag, and sandbag using the water-absorbent resin.

BACKGROUND ART

Sandbag is used as a temporary water stopping measure to prevent inflow of sediment, water, etc. at the time of water disaster such as river flooding and storm surges. Generally, sandbag is used by packing earth and sand in a bag.

In recent years, with the increase of water disasters such as river flooding and storm surges due to abnormal weather such as global warming, there is a need for highly convenient sandbag in consideration of portability, storage space, etc. From such a background, instead of conventional sandbag filled with earth and sand, there has been proposed sandbag in which a water-absorbent resin used for hygienic materials such as disposable diapers and sanitary items is packed in a permeable bag and water is absorbed by the water-absorbent resin during use (see, for example, Patent Document 1).

As such water-absorbent resins, cross-linked products of partially neutralized acrylic acid polymers have been proposed as preferable water-absorbent resins, because they have many advantages, for example, as follows: they have good water-absorption capacity, and acrylic acid used as a raw material is readily industrially available, and thus, they can be produced at low cost with uniform quality additionally, they are resistant to decomposition or degradation for example, Patent Document 2).

PRIOR ART DOCUMENTS

Patent Documents

Patent Document 1: Japanese Patent Laid-open Publication No. S61-169509
Patent Document 2: Japanese Patent Laid-open Publication No. H3-227301

SUMMARY OF THE INVENTION

Problems to be Solved by the Invention

When a large amount of water-absorbent resin is used for sandbag, the water-absorbent resin may be unevenly distributed particularly in the sandbag before water absorption, and water may be absorbed in a state where a large amount of the water-absorbent resin is densely packed. When the water-absorbent resin present in the vicinity of a surface layer absorbs water in a portion where a large amount of the water-absorbent resin is densely packed, a soft gel is formed in the vicinity of the surface layer, and the gel becomes dense to prevent permeation of water into the interior. As a result, a portion of the water-absorbent resin in the sandbag becomes an unswollen lump without sufficiently absorbing water, and there is a problem that the water-absorbent resin is not sufficiently swollen by water absorption and the function as sandbag is not sufficiently fulfilled.

The present invention has a main object to provide a water-absorbent resin that quickly absorbs water, even in sandbag in which a large amount of the water-absorbent resin has been used, that does not easily form unswollen lumps, and that has a high gel swelling volume when water is used to swell the water-absorbent resin.

Means for Solving the Problem

The inventors of the present invention conducted a diligent study to solve the aforementioned problem. As a result, the water-absorbent resin is formed from a polymer of a water-soluble ethylenically unsaturated monomer, and the physiological-saline absorption capacity is 40 to 60 g/g. When a cross-sectional image of the water-absorbent resin obtained by X-ray computed tomography is observed, the ratio (cavity area ratio) as calculated by Equation (I) shown below of the area of cavity portions in the cross-sectional image is 10% or more. As a result, it has been found that the water-absorbent resin quickly absorbs water, does not easily form unswollen lumps, and has a high gel swelling volume when water is used to swell the water-absorbent resin.

Cavity area ratio [%]={total cross-sectional area (B) of cavity portions of the water-absorbent resin/ (total cross-sectional area (A) of resin portions of the water-absorbent resin+total cross-sectional area (B) of cavity portions of the water-absorbent resin)}×100.  (I)

The present invention has been accomplished as a result of further study based on these findings.

In summary, the present invention provides aspects of the invention comprising the following features:

Item 1. The water-absorbent resin comprising a polymer of a water-soluble ethylenically unsaturated monomer, and the physiological-saline absorption capacity is 40 to 60 g/g. When a cross-sectional image of the water-absorbent resin obtained by X-ray computed tomography is observed, the ratio (cavity area ratio) as calculated by Equation (I) shown below of the area of cavity portions in the cross-sectional image is 10% or more:

Cavity area ratio [%]={total cross-sectional area (B) of cavity portions of the water-absorbent resin/ (total cross-sectional area (A) of resin portions of the water-absorbent resin+total cross-sectional area (B) of cavity portions of the water-absorbent resin)}×100.  (I)

Item 2. The water-absorbent resin according to item 1, wherein the water-absorbent resin has a granular shape, a substantially spherical shape, or a shape in which particles having a substantially spherical shape are aggregated.

Item 3. The water-absorbent resin according to item 1 or 2, wherein a cavity area ratio of the water-absorbent resin is 10 to 50%.

Item 4. The water-absorbent resin according to any one of items 1 to 3, wherein a suction height after 5 minutes measured by the following water suction test is 70 mm or more.

(Water Suction Test)

Particles of the water-absorbent resin are classified in advance with JIS standard sieves. The water-absorbent resin on a sieve with a mesh size of 300 μm that pass through a sieve a mesh size of 600 μm are used as resin samples. Next, a glass filter with an outside diameter of 80 mm and a thickness of 5 mm is placed in a Petri dish with an inside diameter of 150 mm and a height of 30 mm. Water (distilled water, using RFD343HA from Advantech Co., Ltd.) is poured to the height of the glass filter, and a filter paper is placed thereon. Separately, 1 g of a resin sample is uniformly dispersed on a bottom of a cylinder with an inside diameter of 25 mm and a height of 150 mm, in which a stainless steel mesh of 400 mesh is attached to the bottom, and placed on the filter paper. After 5 minutes, a height (mm) of the water-absorbent resin swollen by absorbing water is measured.

Item 5. The water-absorbent resin according to item 4, wherein in the water suction test, after 5 minutes and 60 minutes, the height of the water-absorbent resin swollen by absorbing water is measured, and a suction elongation calculated by Equation (II) shown below is 10% or more:

suction elongation [%]=[(suction height after 60 minutes/suction height after 5 minutes)−1]×100.　　(II)

Item 6. Sandbag comprising the water-absorbent resin according to any one of items 1 to 5.

Advantages of the Invention

The present invention can provide a water-absorbent resin that quickly absorbs water, does not easily form unswollen lumps, and has a high gel swelling volume when water is used to swell the water-absorbent resin. Furthermore, in accordance with the present invention, there is provided sandbag comprising the water-absorbent resin.

EMBODIMENTS OF THE INVENTION

1. Water-Absorbent Resin

The water-absorbent resin of the present invention is formed from a polymer of a water-soluble ethylenically unsaturated monomer, and a physiological-saline absorption capacity is 40 to 60 g/g. When a cross-sectional image of the water-absorbent resin obtained by X-ray computed tomography is observed, a ratio (cavity area ratio) as calculated by Equation (1) shown below of an area of cavity portions in the cross-sectional image is 10% or more:

Cavity area ratio [%]={total cross-sectional area (B) of cavity portions of the water-absorbent resin/ (total cross-sectional area (A) of resin portions of the water-absorbent resin+total cross-sectional area (B) of cavity portions of the water-absorbent resin)}×100.　　(I)

The water-absorbent resin of the present invention having such a configuration quickly absorbs water, does not easily form unswollen lumps, and has a high gel swelling volume when water is used to swell the water-absorbent resin. The water-absorbent resin of the present invention will be hereinafter described in detail.

Figure 2:
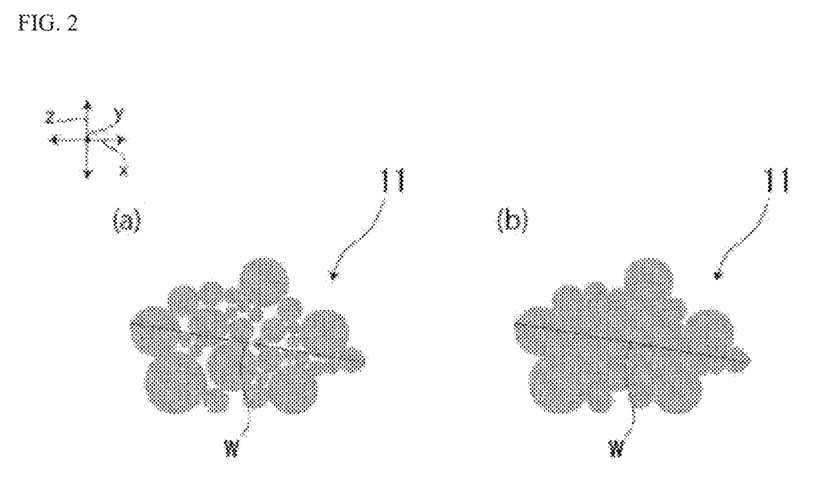
FIG. 2(a) is a schematic diagram of a cross-sectional image of a water-absorbent resin taken using X-ray computed tomography.
FIG. 2(b) is a schematic diagram prepared by filling the cavity portions of FIG. 2(a).

As used herein, the phrase "total cross-sectional area of resin portions in the water-absorbent resin" refers to the total cross-sectional area of portions where the water-absorbent resin is present (filled portions) in the cross-sectional image of the water-absorbent resin, as shown in the schematic diagram of FIG. 2(a), for example. The phrase "total cross-sectional area of cavity portions in the water-absorbent resin" refers to the total area of cavity portions in the water-absorbent resin (blank portions in the water-absorbent resin) in the cross-sectional image of the water-absorbent resin, as shown in the schematic diagram of FIG. 2(a) example.

Examples of shapes of the water-absorbent resin of the present invention include a granular shape, a substantially spherical shape, a shape in which particles having a substantially spherical shape are aggregated, a crushed indefinite shape, a shape in which particles having a crushed indefinite shape are aggregated, and a flat shape. Through the use of reversed phase suspension polymerization or spray droplet polymerization, a water-absorbent resin having a substantially spherical single-particle shape, such as a granular shape, a spherical or elliptical shape, or a shape in which particles having a substantially spherical shape are aggregated, can be produced. Through the use of aqueous solution polymerization, a water-absorbent resin having a crushed indefinite shape or a shape in which particles having a crushed indefinite shape are aggregated can be produced. From the viewpoint of controlling the cavity area ratio, preferred as the shape of the water-absorbent resin is a granular shape, a substantially spherical shape, or a shape in which particles having a substantially spherical shape are aggregated.

The water-absorbent resin of the present invention has a physiological-saline absorption capacity (g/g) of 40 to 60 g/g. The physiological-saline absorption capacity (g/g) is preferably 42 to 55 g/g, more preferably 43 to 54 g/g, and still more preferably 45 to 52 g/g, from the viewpoint of achieving a water-absorbent resin that quickly absorbs water, does not easily form unswollen lumps, and has a high gel swelling volume when water is used to swell the water-absorbent resin.

In addition, the physiological-saline absorption capacity is a value measured by the following method, and the specific method is as Example.

<Physiological-Saline Absorption Capacity>

500 g of a 0.9% by mass aqueous solution of sodium chloride (physiological saline) is weighed out into a 500-ml beaker, and 2.0±0.001 g of the water-absorbent resin is dispersed therein with stirring using a magnetic stirrer bar (8 mm in diameter×30 mm, without a ring) at 600 rpm, so as not to form unswollen lumps. The dispersion is allowed to stand with stirring for 60 minutes, such that the water-absorbent resin is sufficiently swollen. The mass Wa (g) of a JIS standard sieve with openings of 75 μm was measured in advance, and the content in the beaker was filtered through this sieve. The sieve was tilted to form an angle of about 30 degrees with respect to the horizontal and was left to stand in this state for 30 minutes to filter out excessive water. The mass Wb (g) of the sieve containing the water-absorbed gel was measured and physiological-saline absorption capacity was determined by the following equation.

Physiological-saline absorption capacity (g/g)=[Wb−Wa] (g)/mass (g) of the water-absorbent resin.

In the water-absorbent resin of the present invention, when a cross-sectional image of the water-absorbent resin is observed using X-ray computed tomography, the water-absorbent resin has a ratio of the area of cavity portions (cavity area ratio) in the cross-sectional image of 10% or more, as calculated according to Equation (I) above. The cavity area ratio is preferably 10 to 50%, more preferably 10 to 35%, and still more preferably 11 to 32%, from the viewpoint of achieving a water-absorbent resin that quickly absorbs water, does not easily form unswollen lumps, and has a high gel swelling volume when water is used to swell e water-absorbent resin.

In the water-absorbent resin of the present invention, the physiological-saline absorption capacity (g/g) is 40 to 60 g/g, and the cavity area ratio is adjusted to 10% or more; therefore, the amount of the liquid retained in cavity portions (gap portions) of the water-absorbent resin is large, such that the water-absorbent resin that quickly absorbs water, does not easily form unswollen lumps, and is swollen by absorbing water has a high gel swelling volume. As described above, in sandbag using a large amount of the conventional water-absorbent resin, the water-absorbent resin may be unevenly distributed in the sandbag before water absorption, and water may be absorbed in a state where a large amount of the water-absorbent resin is densely packed. When the water-absorbent resin present in the vicinity of a surface layer absorbs water in a portion where a large amount of the water-absorbent resin is densely packed, a soft gel is formed in the vicinity of the surface layer, and the gel becomes dense to prevent permeation of water into the interior. As a result, a portion of the water-absorbent resin in the sandbag becomes an unswollen lump without sufficiently absorbing water, and there is a problem that the water-absorbent resin is not sufficiently swollen by water absorption and the function as sandbag is not sufficiently fulfilled. On the other hand, in the water-absorbent resin of the present invention, the amount of the liquid retained in cavity portions (gap portions) of the water-absorbent resin is large, and the water-absorbent resin that quickly absorbs water, does not easily form unswollen lumps, and is swollen by absorbing water has a high gel swelling volume; therefore, the water-absorbent resin can be suitably used for sandbag.

In the present invention, the cavity area ratio is measured as follows, using X-ray computed tomography.

<Measurement of Cavity Area Ratio Using X-Ray Computed Tomography>

Particles of the water-absorbent resin are classified in advance with JIS standard sieves. Four particles are randomly selected from particles of the water-absorbent resin on a sieve with a mesh size of 180 μm that pass through a sieve with a mesh size of 600 μm, and these particles are used as resin samples. The resin samples are placed on a sample stage of an X-ray computer tomography apparatus, and cross-sectional image data are acquired using X-ray computer tomography. Next, for each of the resin samples, shapes at given angles or given horizontal and vertical cross sections are observed using image analysis software.

Figure 1:
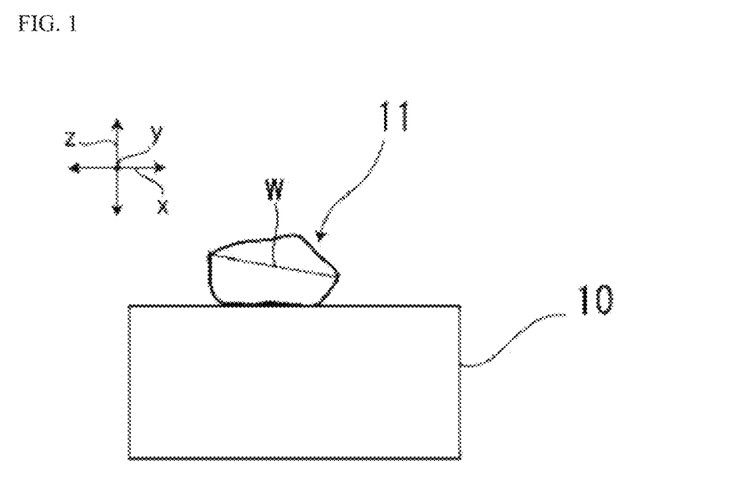
FIG. 1 is a schematic diagram for use in illustrating a method for measuring the cavity area ratio of a water-absorbent resin using X-ray computed tomography.

Here, from given cross sections in horizontal directions (x- and y-directions) and a vertical direction (z-direction) with respect to the mounting surface of the sample stage, a horizontal or vertical cross-sectional image having a maximum distance between given two points on the contour of each of the resin samples is selected. Specifically, as shown in the schematic diagram of FIG. 1, for each of the three directions, x-, y-, and z-directions, that are perpendicular to one another, cross-sectional images of a resin sample 11 on a sample stage 10 are acquired first. Subsequently, for each of these directions, one cross-sectional image having the longest particle length w (see FIGS. 1 and 2) of the resin sample (i.e., a cross-sectional image taken in a position where the particle length of the resin sample is the longest) is selected. Then, a cross-sectional image having the longest particle length w of the resin sample of these three cross-sectional images is selected.

Next, the cavity area ratio is calculated using this cross-sectional image. By means of general-purpose image processing software, the cross-sectional area of the resin sample (total cross-sectional area of resin portions (A) in the water-absorbent resin) (the area of the filled portions in the schematic diagram of FIG. 2(a)) and the cross-sectional area of the cross section of the resin sample in which cavities are filled (the area of the filled portion in the schematic diagram of FIG. 2(b)) are measured. The cross-sectional area of cavity portions in the resin sample (total cross-sectional area of cavity portions (B) in the water-absorbent resin) is calculated by subtracting the cross-sectional area of the resin sample from the cross-sectional area of the resin sample in which cavities are filled. Then, the cavity area ratio of the sin sample is calculated according to Equation (I) shown below. Using this method, the cavity area ratio of the resin sample is measured for each of the four resin samples, and the average value thereof is determined as the cavity area ratio of the water-absorbent resin.

$$\text{Cavity area ratio [\%]} = \{\text{total cross-sectional area (B) of cavity portions of the water-absorbent resin} / (\text{total cross-sectional area (A) of resin portions of the water-absorbent resin} + \text{total cross-sectional area (B) of cavity portions of the water-absorbent resin})\} \times 100. \quad (I)$$

The method for measuring the cavity area ratio using X-ray computed tomography is more specifically described in the Examples.

The water-absorbent resin of the present invention preferably has a median particle diameter of 200 to 600 μm, more preferably 250 to 500 μm, still more preferably 300 to 450 μm, and even more preferably 350 to 450 μm.

The median particle diameter of the water-absorbent resin can be measured using JIS standard sieves. More specifically, the median particle diameter represents a value as measured using the method described in the Examples.

From the viewpoint of achieving a water-absorbent resin that quickly absorbs water, does not easily form unswollen lumps, and has a high gel swelling volume when water is used to swell the water-absorbent resin, a suction height after 5 minutes which is measured by the following water suction test is preferably 70 mm or more, preferably 70 to 100 mm, more preferably 70 to 90 mm, and still more preferably 70 to 80 mm. Furthermore, from the same point of view, in the above-mentioned water suction test, after 5 minutes and 60 minutes, the height of the water-absorbent resin swollen by absorbing water is measured, and a suction elongation calculated by Equation (II) shown below is preferably 10% or more, more preferably 12 to 20%, and still more preferably 14 to 19%.

(Water Suction Test)

Particles of the water-absorbent resin are classified in advance with JIS standard sieves. The water-absorbent resin on a sieve with a mesh size of 300 μm that pass through a sieve a mesh size of 600 μm are used as resin samples. Next, a glass filter with an outside diameter of 80 mm and a thickness of 5 mm is placed in a Petri dish with an inside diameter of 150 mm and a height of 30 mm. Water is poured to the height of the glass filter, and a filter paper is placed thereon. Separately, 1 g of a resin sample is uniformly dispersed on a bottom of a cylinder with an inside diameter of 25 mm and a height of 150 mm, in which a stainless steel mesh of 400 mesh is attached to the bottom, and placed on the filter paper. After 5 minutes and 60 minutes, the height (mm) of the water-absorbent resin swollen by absorbing water is measured.

$$\text{suction elongation [\%]} = [(\text{suction height after 60 minutes}/\text{suction height after 5 minutes}) - 1] \times 100. \quad (II)$$

The water-absorbent resin of the present invention may contain additives suitable for its purpose. Examples of such additives include inorganic powders, surfactants, oxidizing agents, reducing agents, metal chelating agents, radical chain inhibitors, antioxidants, anti-bacterial agents, and deodorizers. For example, when 0.05 to 5 parts by mass of amorphous silica as an inorganic powder is added to 100 parts by mass of the water-absorbent resin, the flowability of the water-absorbent resin can be improved.

2. Method for Producing Water-Absorbent Resin

The water-absorbent resin of the present invention can be produced by polymerizing a water-soluble ethylenically unsaturated monomer.

To polymerize the water-soluble ethylenically unsaturated monomer, a representative polymerization method such as aqueous solution polymerization, spray droplet polymerization, emulsion polymerization, or reversed phase suspension polymerization is used. In aqueous solution polymerization, polymerization is performed by heating, optionally with stirring, an aqueous solution of the water-soluble ethylenically unsaturated monomer. Examples of methods for controlling the cavity area ratio and the physiological-saline absorption capacity in aqueous solution polymerization include a method in which a foaming agent, for example, is added to the water-soluble ethylenically unsaturated monomer; and a method in which particles of a water-absorbent resin obtained by aqueous solution polymerization are aggregated. In reversed phase suspension polymerization, polymerization is performed by heating the water-soluble ethylenically unsaturated monomer with stirring in a hydrocarbon dispersion medium. Examples of methods for controlling the cavity area ratio and the physiological-saline absorption capacity in reversed phase suspension polymerization include a method in which a foaming agent, for example, is added to the first-stage water-soluble ethylenically unsaturated monomer; a method in which the median particle diameter of primary particles obtained in the first-stage reversed phase suspension polymerization is controlled; and a method in which a hydrous gel obtained after the first-stage polymerization is further heated. In the present invention, reversed phase suspension polymerization is preferred from the viewpoint of allowing the polymerization reaction to be precisely controlled, and a wide range of particle diameters to be controlled.

One exemplary method for producing the water-absorbent resin of the present invention will be hereinafter described.

Examples of methods for producing the water-absorbent resin include a method for producing the water-absorbent resin by performing reversed phase suspension polymerization of the water-soluble ethylenically unsaturated monomer in a hydrocarbon dispersion medium, the method including the steps of: performing the polymerization in the presence of a radical polymerization initiator; and post-crosslinking the hydrous gel obtained by the polymerization in the presence of a post-crosslinking agent.

In the method for producing the water-absorbent resin of the present invention, an internal-crosslinking agent may be added, as required, to the water-soluble ethylenically unsaturated monomer to obtain a hydrous gel having an internally crosslinked structure.

<Polymerization Step>

[Water-Soluble Ethylenically Unsaturated Monomer]

Examples of the water-soluble ethylenically unsaturated monomer include (meth)acrylic acid ("acryl" and "methacryl" are herein collectively referred to as "(meth)acryl"; the same applies below) and salts thereof; 2-(meth)acrylamido-2-methylpropanesulfonic acid and salts thereof; non-ionic monomers such as (meth)acrylamide, N,N-dimethyl (meth)acrylamide, 2-hydroxyethyl(meth)acrylate, N-methylol(meth)acrylamide, and polyethylene glycol mono(meth)acrylate; and amino group-containing unsaturated monomers such as N,N-diethylaminoethyl(meth)acrylate, N,N-diethylaminopropyl(meth)acrylate, and diethylaminopropyl(meth)acrylamide, as well as quaternary compounds thereof. Preferred among these water-soluble ethylenically unsaturated monomers are (meth)acrylic acid and salts thereof, (meth)acrylamide, and N,N-dimethyl (meth)acrylamide, and more preferred are (meth)acrylic acid and salts thereof, from the viewpoint of being readily industrially available. These water-soluble ethylenically unsaturated monomers may be used alone or in combination of two or more.

Among these water-soluble ethylenically unsaturated monomers, acrylic acid and salts thereof are widely used as raw materials of water-absorbent resins. Copolymers of acrylic acid and/or salts thereof with other water-soluble ethylenically unsaturated monomers as mentioned above may also be used. In this case, an acrylic acid and/or a salt thereof as a main water-soluble ethylenically unsaturated monomer is preferably used in an amount of 70 to 100 mol % based on the total amount of water-soluble ethylenically unsaturated monomers.

The water-soluble ethylenically unsaturated monomer is preferably dispersed as an aqueous solution in a hydrocarbon dispersion medium, and then subjected to reversed phase suspension polymerization. When the water-soluble ethylenically unsaturated monomer is in the form of an aqueous solution, the dispersion efficiency in the hydrocarbon dispersion medium can be increased. The concentration of the water-soluble ethylenically unsaturated monomer in the aqueous solution is preferably in the range of 20% by mass to not more than the saturation concentration. The concentration of the water-soluble ethylenically unsaturated monomer is more preferably 55% by mass or less, still more preferably 50% by mass or less, and even more preferably 45% by mass or less. On the other hand, the concentration of the water-soluble ethylenically unsaturated monomer is more preferably 25% by mass or more, still more preferably 28% by mass or more, and even more preferably 30% by mass or more.

When the water-soluble ethylenically unsaturated monomer has an acid group such as (meth)acrylic acid or 2-(meth) acrylamido-2-methylpropanesulfonic acid, the acid group may be neutralized with an alkaline neutralizing agent, as required, before use. Examples of such alkaline neutralizing agents include alkali metal salts such as sodium hydroxide, sodium carbonate, sodium hydrogen carbonate, potassium hydroxide, and potassium carbonate; and ammonia. These alkaline neutralizing agents may be used in the form of aqueous solutions to facilitate the neutralization operation. The above-mentioned alkaline neutralizing agents may be used alone or in combination of two or more.

The degree of neutralization of the water-soluble ethylenically unsaturated monomer with an alkaline neutralizing agent, calculated as the degree of neutralization of all acid groups in the water-soluble ethylenically unsaturated monomer, is preferably 10 to 100 mol %, more preferably 30 to 90 mol %, still more preferably 40 to 85 mol %, and even more preferably 50 to 80 mol %.

[Radical Polymerization Initiator]

Examples of the radical polymerization initiator to be added in the polymerization step include persulfates such as potassium persulfate, ammonium persulfate, and sodium persulfate; peroxides such as methyl ethyl ketone peroxide, methyl isobutyl ketone peroxide, di-t-butyl peroxide, t-butyl cumyl peroxide, t-butyl peroxyacetate, t-butyl peroxyisobutyrate, t-butyl peroxypivalate, and hydrogen peroxide; and azo compounds such as 2,2'-azobis(2-amidinopropane) dihydrochloride, 2,2'-azobis[2-(N-phenylamidino)propane] dihydrochloride, 2,2'-azobis[2-(N-allylamidino)propane] dihydrochloride, 2,2'-azobis{2-[1-(2-hydroxyethyl)-2-imidazolin-2-yl]propane} dihydrochloride, 2,2'-azobis{2-methyl-N-[1,1-bis(hydroxymethyl)-2-hydroxyethyl]propionamide}, 2,2'-azobis[2-methyl-N-(2-hydroxyethyl)-propionamide], and 4,4'-azobis(4-cyanovaleric acid). Preferred among these radical polymerization initiators are potassium persulfate, ammonium persulfate, sodium persulfate, and 2,2'-azobis(2-amidinopropane) dihydrochloride, from the viewpoint of being readily available and easy to handle. These radical polymerization initiators may be used alone or in combination of two or more.

The above-mentioned radical polymerization initiators may also be used in combination with reducing agents such as sodium sulfite, sodium hydrogensulfite, ferrous sulfate, and L-ascorbic acid to be used as redox polymerization initiators.

The amount of the radical polymerization initiator to be used may be, for example, 0.00005 to 0.01 mol per mole of the water-soluble ethylenically unsaturated monomer, although not limited thereto. The use of the radical polymerization initiator in the above-defined range of amounts can avoid the occurrence of an abrupt polymerization reaction, and can complete the polymerization reaction in an appropriate time.

[Internal-Crosslinking Agent]

Examples of the internal-crosslinking agent include those that can crosslink the polymer of the water-soluble ethylenically unsaturated monomer to be used, for example: unsaturated polyesters obtained by reacting polyols such as diols and triols, e.g., (poly)ethylene glycol ["(poly)" means both cases with and without the prefix "poly"; the same applies below], (poly)propylene glycol, 1,4-butanediol, trimethylolpropane, and (poly)glycerin, with unsaturated acids such as (meth)acrylic acid, maleic acid, and fumaric acid; bisacrylamides such as N,N-methylenebisacrylamide; di or tri(meth)acrylic acid esters obtained by reacting polyepoxides with (meth)acrylic acid; carbamyl di(meth)acrylates obtained by reacting polyisocyanates such as tolylene diisocyanate and hexamethylene diisocyanate with hydroxyethyl (meth)acrylate; compounds having two or more polymerizable unsaturated groups such as allylated starch, allylated cellulose, diallyl phthalate, N,N',N"-triallylisocyanate, and divinylbenzene; polyglycidyl compounds such as diglycidyl compounds and triglycidyl compounds, e.g., (poly)ethylene glycol diglycidyl ether, (poly)propylene glycol diglycidyl ether, and (poly)glycerin diglycidyl ether; epihalohydrin compounds such as epichlorohydrin, epibromohydrin, and α-methylepichlorohydrin; compounds having two or more reactive functional groups such as isocyanate compounds, e.g., 2,4-tolylene diisocyanate and hexamethylene diisocyanate; and oxetane compounds such as 3-methyl-3-oxetanemethanol, 3-ethyl-3-oxetanemethanol, 3-butyl-3-oxetanemethanol, 3-methyl-3-oxetaneethanol, 3-ethyl-3-oxetaneethanol, and 3-butyl-3-oxetaneethanol. Among these internal-crosslinking agents, polyglycidyl compounds are preferably used, diglycidyl ether compounds are more preferably used, and (poly)ethylene glycol diglycidyl ether, (poly)propylene glycol diglycidyl ether, and (poly)glycerin diglycidyl ether are still more preferably used. These internal-crosslinking agents may be used alone or in combination of two or more.

The amount of the internal-crosslinking agent to be used is preferably 0.000001 to 0.02 mol, more preferably 0.00001 to 0.01 mol, still more preferably 0.00001 to 0.005 mol, and even more preferably 0.00001 to 0.002 mol, per mole of the water-soluble ethylenically unsaturated monomer.

[Hydrocarbon Dispersion Medium]

Examples of the hydrocarbon dispersion medium include $C_{6-8}$ aliphatic hydrocarbons such as n-hexane, n-heptane, 2-methylhexane, 3-methylhexane, 2,3-dimethylpentane, 3-ethylpentane, and n-octane; alicyclic hydrocarbons such as cyclohexane, methylcyclohexane, cyclopentane, methylcyclopentane, trans-1,2-dimethylcyclopentane, cis-1,3-dimethylcyclopentane, and trans-1,3-dimethylcyclopentane; and aromatic hydrocarbons such as benzene, toluene, and xylene. Among these hydrocarbon dispersion media, n-hexane, n-heptane, and cyclohexane, which are readily industrially available, stable in quality, and inexpensive, are particularly suitably used. These hydrocarbon dispersion media may be used alone or in combination of two or more. Examples of mixtures of hydrocarbon dispersion media include commercially available products such as Exxsol Heptane (from Exxon Mobil Corporation; containing 75 to 85% by mass of heptane and its isomeric hydrocarbons). The use of such a commercially available product also leads to favorable results.

The amount of the hydrocarbon dispersion medium to be used is preferably 100 to 1500 parts by mass, and more preferably 200 to 1400 parts by mass, per 100 parts by mass of the first-stage water-soluble ethylenically unsaturated monomer, from the viewpoint of homogeneously dispersing the water-soluble ethylenically unsaturated monomer, and facilitating control of the polymerization temperature. As described below, reversed phase suspension polymerization is performed in a single stage or two or more multiple stages. The first-stage polymerization as mentioned above refers to the first-stage polymerization reaction in single-stage polymerization or multi-stage polymerization (the same applies below).

[Dispersion Stabilizer]

(Surfactant)

In reversed phase suspension polymerization, a dispersion stabilizer may be used to improve the dispersion stability of the water-soluble ethylenically unsaturated monomer in the hydrocarbon dispersion medium. A surfactant may be used as such a dispersion stabilizer.

Examples of the surfactant include sucrose fatty acid esters, polyglycerin fatty acid esters, sorbitan fatty acid esters, polyoxyethylene sorbitan fatty acid esters, polyoxyethylene glycerin fatty acid esters, sorbitol fatty acid esters, polyoxyethylene sorbitol fatty acid esters, polyoxyethylene alkyl ethers, polyoxyethylene alkyl phenyl ethers, polyoxyethylene castor oil, polyoxyethylene hydrogenated castor oil, alkyl allyl formaldehyde condensate polyoxyethylene ethers, polyoxyethylene-polyoxypropylene block copolymers, polyoxyethylene polyoxypropyl alkyl ethers, polyethylene glycol fatty acid esters, alkyl glucosides, glyconamides, polyoxyethylene fatty acid amides, polyoxyethylene alkylamines, polyoxyethylene alkyl ether phosphates, and polyoxyethylene alkyl allyl ether phosphates. Among these surfactants, sucrose fatty acid esters, polyglycerin fatty acid esters, and sorbitan fatty acid esters are particularly preferably used, from the viewpoint of dispersion stability of the monomer. These surfactants may be used alone or in combination of two or more.

The amount of the surfactant to be used is preferably 0.1 to 30 parts by mass, and more preferably 0.3 to 20 parts by mass, per 100 parts by mass of the first-stage water-soluble ethylenically unsaturated monomer.

(Polymeric Dispersion Agent)

A polymeric dispersion agent may be used in combination with the above-described surfactant, as a dispersion stabilizer to be used in reversed phase suspension polymerization.

Examples of the polymeric dispersion agent include maleic anhydride modified polyethylene, maleic anhydride modified polypropylene, maleic anhydride modified ethylene-propylene copolymers, maleic anhydride modified EPDM (ethylene-propylene-diene terpolymers), maleic anhydride modified polybutadiene, maleic anhydride-ethylene copolymers, maleic anhydride-propylene copolymers, maleic anhydride-ethylene-propylene copolymers, maleic anhydride-butadiene copolymers, polyethylene, polypropylene, ethylene-propylene copolymers, oxidized polyethylene, oxidized polypropylene, oxidized ethylene-propylene copolymers, ethylene-acrylic acid copolymers, ethyl cellulose, and ethyl hydroxyethyl cellulose. Among these polymeric dispersion agents, maleic anhydride modified polyethylene, maleic anhydride modified polypropylene, maleic anhydride modified ethylene-propylene copolymers, maleic anhydride-ethylene copolymers, maleic anhydride-propylene copolymers, maleic anhydride-ethylene-propylene copolymers, polyethylene, polypropylene, ethylene-propylene copolymers, oxidized polyethylene, oxidized polypropylene, and oxidized ethylene-propylene copolymers are particularly preferably used, from the viewpoint of dispersion stability of the monomer. These polymeric dispersion agents may be used alone or in combination of two or more.

The amount of the polymeric dispersion agent to be used is preferably 0.1 to 30 parts by mass, and more preferably 0.3 to 20 parts by mass, per 100 parts by mass of the first-stage water-soluble ethylenically unsaturated monomer.

[Other Components]

In the method for producing the water-absorbent resin, other components may be added, as desired, to the aqueous solution containing the water-soluble ethylenically unsaturated monomer to be subjected to reversed phase suspension polymerization. Various additives such as thickeners, foaming agents, and chain transfer agents may be added as other components.

(Thickener)

By way of example, a thickener may be added to the aqueous solution containing the water-soluble ethylenically unsaturated monomer to be subjected to reversed phase suspension polymerization. When a thickener is thus added to adjust the viscosity of the aqueous solution, the median particle diameter of the particles obtained by reversed phase suspension polymerization can be controlled.

Examples of usable thickeners include hydroxyethylcellulose, hydroxypropylcellulose, methylcellulose, carboxymethylcellulose, polyacrylic acid, (partially) neutralized polyacrylic acid, polyethylene glycol, polyacrylamide, polyethyleneimine, dextrin, sodium alginate, polyvinyl alcohol, polyvinylpyrrolidone, and polyethylene oxide. For a fixed stirring rate during the polymerization, the higher the viscosity of the aqueous solution containing the water-soluble ethylenically unsaturated monomer, the larger the median particle diameter of the primary particles and/or secondary particles of the resulting particles tends to be.

(Foaming Agent)

By way of example, a foaming agent may be added to the aqueous solution containing the water-soluble ethylenically unsaturated monomer to be subjected to reversed phase suspension polymerization. When a foaming agent is thus added to introduce foam into the aqueous solution, the cavity area ratio and the physiological-saline absorption capacity of the particles obtained by reversed phase suspension polymerization can be controlled. Various foaming agents such as carbonates and hydrogencarbonates may be used as the foaming agent.

[Reversed Phase Suspension Polymerization]

To perform reversed phase suspension polymerization, for example, the aqueous monomer solution containing the water-soluble ethylenically unsaturated monomer is dispersed in a hydrocarbon dispersion medium, in the presence of a dispersion stabilizer. Here, so long as the dispersion stabilizer (a surfactant or a polymeric dispersion agent) is added before the beginning of the polymerization reaction, it may be added either before or after the aqueous monomer solution is dispersed in the hydrocarbon dispersion medium.

In particular, from the viewpoint of readily reducing the amount of remaining hydrocarbon dispersion medium in the resulting water-absorbent resin, it is preferred to disperse the aqueous monomer solution in the hydrocarbon dispersion medium in which a polymeric dispersion agent is dispersed, followed by dispersing a surfactant therein, and then perform polymerization.

Such reversed phase suspension polymerization can be performed in a single stage or two or more multiple stages. From the viewpoint of enhancing productivity, reversed phase suspension polymerization is preferably performed in two or three stages.

Reversed phase suspension polymerization with two or more multiple stages may be performed as follows: the first-stage reversed phase suspension polymerization is performed; subsequently, a water-soluble ethylenically unsaturated monomer is added to the reaction mixture obtained by the first-stage polymerization reaction and mixed, and reversed phase suspension polymerization in the second and subsequent stages is performed in the same manner as in the first stage. In reversed phase suspension polymerization in each of the second and subsequent stages, in addition to the water-soluble ethylenically unsaturated monomer, a radical polymerization initiator is preferably added within the above-described range of molar ratios of each of the components relative to the water-soluble ethylenically unsaturated monomer, based on the amount of the water-soluble ethylenically unsaturated monomer added during reversed phase suspension polymerization in each of the second and subsequent stages. In the second and subsequent stages of polymerization, an internal-crosslinking agent may also be added, as required, to the water-soluble ethylenically unsaturated monomer.

The reaction temperature during the polymerization reaction is preferably 20 to 110° C., and more preferably 40 to 90° C., from the viewpoint of allowing the polymerization to proceed quickly to reduce the polymerization time for improved economical efficiency, and readily removing the heat of polymerization to perform a smooth reaction.

During the production of the water-absorbent resin of the present invention, the system in which the hydrous gel is dispersed in the hydrocarbon dispersion medium after the first-stage reversed phase suspension polymerization may be heated, as required, by applying external energy such as heat. The heating temperature is preferably 50 to 100° C., and more preferably 60 to 90° C. The heating time is preferably 0.1 to 3 hours.

The aqueous monomer solution may be stirred with any of various well-known stirring blades. Specific examples of usable stirring blades include propeller blades, paddle blades, anchor blades, turbin blades, Pfaudler blades, ribbon blades, FULLZONE blades (Shinko Pantec Co., Ltd.), MAXBLEND blades (Sumitomo Heavy Industries. Ltd.), and SUPERMIX blades (Satake Chemical Equipment Mfg., Ltd.). The median particle diameter of the primary particles obtained in the first-stage polymerization can be controlled by adjusting the stirring rate in the first-stage reversed phase suspension polymerization. The stirring rate can be adjusted, for example, by adjusting the rotational speed of stirring.

In the method for producing the water-absorbent resin of the present invention, the above-described cavity area ratio can be controlled to 10% or more, by, for example, adjusting the amount of the radical polymerization initiator and the amount of the internal-crosslinking agent to be added to the water-soluble ethylenically unsaturated monomer during reversed phase suspension polymerization, by controlling the median particle diameter of the primary particles in the first-stage polymerization, and by heating the hydrous gel after the first-stage polymerization. These procedures may be performed alone or in combination.

<Post-Crosslinking Step>

Next, the water-absorbent resin of the present invention is obtained by post-crosslinking the hydrous gel having an internally crosslinked structure obtained by polymerizing the water-soluble ethylenically unsaturated monomer, using a post-crosslinking agent (post-crosslinking reaction). The post-crosslinking reaction is preferably preformed in the presence of a post-crosslinking agent, after the polymerization of the water-soluble ethylenically unsaturated monomer. When the hydrous gel having an internally crosslinked structure is thus subjected to the post-crosslinking reaction after the polymerization, a water-absorbent resin can be achieved in which the crosslinking density in the vicinity of the surface has been increased to improve various kinds of performance such as the water-absorption capacity under a load.

Examples of the post-crosslinking agent include compounds having two or more reactive functional groups. Examples of the post-crosslinking agent include polyols such as ethylene glycol, propylene glycol, 1,4-butanediol, trimethylolpropane, glycerin, polyoxyethylene glycol, polyoxypropylene glycol, and polyglycerin; polyglycidyl compounds such as (poly)ethylene glycol diglycidyl ether, (poly)glycerin diglycidyl ether, (poly)glycerin triglycidyl ether, trimethylolpropane triglycidyl ether, (poly)propylene glycol polyglycidyl ether, and (poly)glycerol polyglycidyl ether; haloepoxy compounds such as epichlorohydrin, epibromohydrin, and α-methylepichlorohydrin; isocyanate compounds such as 2,4-tolylene diisocyanate and hexamethylene diisocyanate; oxetane compounds such as 3-methyl-3-oxetanemethanol, 3-ethyl-3-oxetanemethanol, 3-butyl-3-oxetanemethanol, 3-methyl-3-oxetaneethanol, 3-ethyl-3-oxetaneethanol, and 3-butyl-3-oxetaneethanol; oxazoline compounds such as 1,2-ethylenebisoxazoline; carbonate compounds such as ethylene carbonate; and hydroxyalkylamide compounds such as bis[N,N-di(β-hydroxyethyl)]adipamide. Preferred among these post-crosslinking agents are polyglycidyl compounds such as (poly)ethylene glycol diglycidyl ether, (poly)glycerin diglycidyl ether, (poly)glycerin triglycidyl ether, trimethylolpropane triglycidyl ether, (poly)propylene glycol polyglycidyl ether, and (poly)glycerol polyglycidyl ether. These post-crosslinking agents may be used alone or in combination of two or more.

The amount of the post-crosslinking agent to be used is preferably 0.00001 to 0.01 mol, more preferably 0.00005 to 0.005 mol, and still more preferably 0.0001 to 0.002 mol, per mole of the water-soluble ethylenically unsaturated monomer subjected to polymerization. In the case of multistage reversed-phase suspension polymerization by two or more stages, the amount of the water-soluble ethylenically unsaturated monomer, which is the basis of the amount of the post-crosslinking agent to be used, is the total amount of the water-soluble ethylenically unsaturated monomer used in each stage.

The post-crosslinking agent may be added as is or as an aqueous solution. As required, a solution of the post-crosslinking agent in a hydrophilic organic solvent may be added. Examples of such hydrophilic organic solvents include lower alcohols such as methyl alcohol, ethyl alcohol, n-propyl alcohol, and isopropyl alcohol; ketones such as acetone and methyl ethyl ketone; ethers such as diethyl ether, dioxane, and tetrahydrofuran; amides such as N,N-dimethylformamide; and sulfoxides such as dimethylsulfoxide. These hydrophilic organic solvents may be used alone, in combination of two or more, or as a mixture with water.

The post-crosslinking agent may be added after the polymerization reaction of the water-soluble ethylenically unsaturated monomer is substantially completed. The post-crosslinking agent is preferably added in the presence of 1 to 400 parts by mass of water, more preferably 5 to 200 parts by mass of water, still more preferably 10 to 100 parts by mass of water, and even more preferably 20 to 60 parts by mass of water, per 100 parts by mass of the water-soluble ethylenically unsaturated monomer. The amount of water herein refers to the total amount of the water contained in the reaction system and the water that is used, as required, during the addition of the post-crosslinking agent.

The reaction temperature during the post-crosslinking reaction is preferably 50 to 250° C., more preferably 60 to 180° C., still more preferably 60 to 140° C., and even more preferably 70 to 120° C. The reaction time of the post-crosslinking reaction is preferably 1 to 300 minutes, and more preferably 5 to 200 minutes.

<Drying Step>

The method for producing the water-absorbent resin of the present invention may include, after performing reversed phase suspension polymerization as described above, a drying step of adding external energy such as heat to remove the water, hydrocarbon dispersion medium, and the like by distillation. To remove the water in the hydrous gel after reversed phase suspension polymerization, the system in which the hydrous gel is dispersed in the hydrocarbon dispersion medium is heated to distill the water and the hydrocarbon dispersion medium out of the system by azeotropic distillation. Here, if the distilled hydrocarbon dispersion medium only is returned into the system, continuous azeotropic distillation can be performed. In this case, the temperature within the system during drying is maintained at a temperature not higher than the azeotropic temperature with the hydrocarbon dispersion medium, which is preferable from the viewpoint of inhibiting deterioration of the resin. Subsequently, the water and the hydrocarbon dispersion medium are distilled off to obtain particles of the water-absorbent resin. By controlling the treatment conditions for the drying step after the polymerization to adjust the amount of water to be removed, various kinds of performance of the resulting water-absorbent resin can be controlled.

In the drying step, the drying treatment by distillation may be performed under atmospheric pressure or reduced pressure. The drying treatment may also be performed in a stream of nitrogen or the like, from the viewpoint of enhancing the drying efficiency. When the drying treatment is performed under atmospheric pressure, the drying temperature is preferably 70 to 250° C., more preferably 80 to 180° C., still more preferably 80 to 140° C., and even more preferably 90 to 130° C. When the drying treatment is performed under reduced pressure, the drying temperature is preferably 40 to 160° C., and more preferably 50 to 110° C.

When the post-crosslinking step with a post-crosslinking agent is performed after the polymerization of the monomer by reversed phase suspension polymerization, the drying step by distillation is performed as described above, after the completion of the post-crosslinking step. Alternatively, the post-crosslinking step and the drying step may be performed simultaneously.

Furthermore, various additives such as chelating agents, reducing agents, oxidizing agents, anti-bacterial agents, and deodorizers may be added, as required, to the water-absorbent resin, after polymerization, during drying, or after drying.

3. Sandbag

Since the water-absorbent resin of the present invention quickly absorbs water, does not easily form unswollen lumps, and has a high gel swelling volume when water is used to swell the water-absorbent resin, the water-absorbent resin can be suitably used for sandbag, for example.

When the water-absorbent resin of the present invention is used for sandbag, specific modes of use are not particularly limited, and, for example, the water-absorbent resin of the present invention is packed in a water-permeable bag and swollen by immersion in water, whereby the water-absorbent resin may be used as sandbag. Alternatively, the water-absorbent resin may be mixed with sandbag, gravel, sand, mud and the like within the range not interfering with the water-absorption capacity of the water-absorbent resin and packed in a water-permeable bag to be used as sandbag.

In the sandbag of the present invention, although the proportion of the water-absorbent resin of the present invention to be packed in a water-permeable bag is not particularly limited, the proportion of the water-absorbent resin is, for example, 50% by mass or more and preferably 60 to 100% by mass, 70 to 100% by mass, etc.

EXAMPLES

Hereinafter, the present invention will be described in detail with reference to examples and comparative examples. However, the present invention is not limited to the examples.

Water-absorbent resins obtained in the following examples and comparative examples were evaluated using the tests described below. Each of the testing methods for evaluation will be hereinafter described.

<Measurement of Cavity Area Ratio Using X-Ray Computed Tomography>

Particles of the water-absorbent resin were classified in advance with JIS standard sieves. Four particles were randomly selected from particles of the water-absorbent resin on a sieve with a mesh size of 180 μm that passed through a sieve with a mesh size of 600 μm, and these particles were used as resin samples. The resin samples were placed on a sample stage of an X-ray computer tomography apparatus (MicroXCT-400 from Xradia Inc.), and cross-sectional image data were acquired using X-ray computer tomography. Next, for each of the resin samples, shapes at given angles or given horizontal and vertical cross sections were observed using image analysis software (myVGL from Volume Graphics GmbH).

Here, from given cross sections in horizontal directions (x- and y-directions) and a vertical direction (z-direction) with respect to the mounting surface of the sample stage, a horizontal or vertical cross-sectional image having a maximum distance between given two points on the contour of each of the resin samples was selected. Specifically, as shown in the schematic diagram of FIG. 1, for each of the three directions, x-, y-, and z-directions, that are perpendicular to one another, cross-sectional images of a resin sample 11 on the sample stage 10 were acquired first. Subsequently, for each of these directions, one cross-sectional image having the longest particle length w (see FIGS. 1 and 2) of the resin sample (i.e., a cross-sectional image taken in a position where the particle length of the resin sample was the longest) was selected. Then, a cross-sectional image having the longest particle length w of the resin sample of these three cross-sectional images was selected.

More specifically, initially, cross sections (z-x sections) of slices of the resin sample were observed in y-direction while shifting the position in y-direction with respect to the mounting surface of the sample stage, and a z-x cross section having the longest particle length of the resin sample was acquired. Similarly, cross sections (a z-y cross section and an x-y cross section) having the longest particle length of the resin sample as observed in x- and z-directions were acquired. Then, a cross section having the longest particle length w (see FIGS. 1 and 2) of the resin sample of these three cross sections was selected.

Next, the cavity area ratio was calculated using this cross-sectional image. By means of general-purpose image processing software (NanoHunter NS2K-Pro/Lt from Nanosystem Corporation), the cross-sectional area of the resin sample (total cross-sectional area of resin portions (A) in the water-absorbent resin) (the area of the filled portions in the schematic diagram of FIG. 2(a)) and the cross-sectional area of the cross section of the resin sample in which cavities are filled (the area of the filled portion in the schematic diagram of FIG. 2(b)) were measured. The cross-sectional area of cavity portions in the resin sample (total cross-sectional area of cavity portions (B) in the water-absorbent resin) was calculated by subtracting the cross-sectional area of the resin sample from the cross-sectional area of the resin sample in which cavities are filled. Then, the cavity area ratio of the resin sample was calculated according to Equation (I) shown below. Using this method, the cavity area ratio of the resin sample was measured for each of the four resin samples, and the average value thereof was determined as the cavity area ratio of the water-absorbent resin.

Cavity area ratio [%]={total cross-sectional area (B) of cavity portions of the water-absorbent resin/ (total cross-sectional area (A) of resin portions of the water-absorbent resin+total cross-sectional area (B) of cavity portions of the water-absorbent resin)}×100. (I)

The conditions for X-ray computer tomography were as follows:
Apparatus: MicroXCT-400 (Xradia Inc.)
X-ray tube voltage: 80 kV
X-ray tube current: 122 μA
Optical lens: 10 times
Irradiation time: 0.8 sec
Pixel size: 2.149 μm
X-ray source-to-sample distance: 29.1533 mm
Detector-to-sample distance: 7.3723 mm
Imaging range: −90° to 90°
Image analyzer: myVGL 2.2 (Volume Graphics GmbH)

<Median Particle Diameter>

JIS standard sieves having mesh sizes of 850 μm, 600 μm, 500 μm, 425 μm, 300 μm, 250 μm, and 150 μm, and a receiving tray were combined in that order from the top.

50 g of the water-absorbent resin was placed on the top sieve of the combined sieves, and shaken for 20 minutes with a Ro-Tap shaker to conduct classification. After the classification, the particle size distribution was determined by calculating the mass of the water-absorbent resin remaining on each sieve as the mass percentage relative to the total mass. With regard to this particle size distribution, the mass percentage of the water-absorbent resin remaining on each sieve was integrated in descending order of particle diameter. Thereby, the relationship between the sieve mesh size and the integrated value of the mass percentage of the water-absorbent resin remaining on each sieve was plotted on logarithmic probability paper. The plots on the probability paper were connected with straight lines, and a particle diameter equivalent to 50% by mass of the integrated mass percentage was determined as the median particle diameter.

<Physiological-Saline Absorption Capacity>

500 g of a 0.9% by mass aqueous solution of sodium chloride (physiological saline) was weighed out into a 500-ml beaker, and 2.0±0.001 g of the water-absorbent resin was dispersed therein with stirring using a magnetic stirrer bar (8 mm in diameter×30 mm, without a ring) at 600 rpm, so as not to form unswollen lumps. The dispersion was allowed to stand with stirring for 60 minutes, such that the water-absorbent resin was sufficiently swollen. The mass Wa (g) of a JIS standard sieve with openings of 75 μm was measured in advance, and the content in the beaker was filtered through this sieve. The sieve was tilted to form an angle of about 30 degrees with respect to the horizontal and was left to stand in this state for 30 minutes to filter out excessive water. The mass Wb (g) of the sieve containing the water-absorbed gel was measured and physiological-saline absorption capacity was determined by the following equation.

Physiological-saline absorption capacity (g/g)=[Wb−Wa](g)/mass (g) of the water-absorbent resin <Water Suction Test>

Particles of the water-absorbent resin are classified in advance with JIS standard sieves. The water-absorbent resin on a sieve with a mesh size of 300 μm that pass through a sieve a mesh size of 600 μm are used as resin samples. Next, a glass filter with an outside diameter of 80 mm and a thickness of 5 mm is placed in a Petri dish with an inside diameter of 150 mm and a height of 30 mm. Water (distilled water, using RFD343HA from Advantech Co., Ltd.) is poured to the height of the glass filter, and a filter paper is placed thereon. Separately, 1 g of a resin sample is uniformly dispersed on a bottom of a cylinder with an inside diameter of 25 mm and a height of 150 mm, in which a stainless steel mesh of 400 mesh is attached to the bottom, and placed on the filter paper. After 5 minutes and 60 minutes, the height (mm) of the water-absorbent resin swollen by absorbing water is measured.

suction elongation [%]=[(suction height after 60 minutes/suction height after 5 minutes)−1]×100.   (II)

<Production of Water-Absorbent Resin>

Example 1

A 2-L cylindrical round-bottomed separable flask having an inside diameter of 110 mm, and equipped with a reflux condenser, a dropping funnel, a nitrogen gas inlet tube, and a stirrer having stirring blades composed of two sets of four inclined paddle blades with a blade diameter of 50 mm was prepared. This flask was charged with 300 g of n-heptane as a hydrocarbon dispersion medium, and then 0.74 g of a sucrose stearate having an HLB of 3 (Ryoto sugar ester S-370 from Mitsubishi-Kagaku Foods Corporation) as a surfactant and 0.74 g of a maleic anhydride-modified ethylene-propylene copolymer (Hi-wax 1105A from Mitsui Chemicals, Inc.) as a polymeric dispersion agent were added thereto. The mixture was heated with stirring to 80° C. to dissolve the surfactant, and then cooled to 50° C.

Separately, 92 g (1.02 mol) of an 80% by mass aqueous solution of acrylic acid was placed in a 500-mL Erlenmeyer flask, and 146.0 g of a 21% by mass aqueous solution of sodium hydroxide was added dropwise with external cooling to accomplish 75 mol % neutralization. Then, 0.092 g of hydroxyethylcellulose (HEC AW-15F from Sumitomo Seika Chemicals Co. Ltd.) as a thickener, 0.11 g (0.00041 mol) of 2,2'-azobis(2-amidinopropane) dihydrochloride as an azo-based compound, and 0.0064 g (0.000037 mol) of ethylene glycol diglycidyl ether as an internal-crosslinking agent were added and dissolved. As a result, an aqueous monomer solution was prepared.

The rotation speed of the stirrer was adjusted to 600 rpm. Then, the aqueous monomer solution prepared as described above was added into the separable flask, and the atmosphere within the system was sufficiently replaced with nitrogen. The flask was subsequently immersed in a water bath at 70° C. and heated to start polymerization. Next, at the time when the temperature within the system had reached a peak temperature (80 to 90° C.) of polymerization, the rotation speed of the stirrer was changed to 1000 rpm, and in an oil bath at 125° C., 23 g of water was distilled out of the system while refluxing n-heptane by azeotropic distillation of water and n-heptane, so that first-stage polymerization slurry was obtained.

Separately, 128.8 g (1.43 mol) of an 80% by mass aqueous solution of acrylic acid was placed in another 500-mL Erlenmeyer flask, and 159.0 g of a 27% by mass aqueous solution of sodium hydroxide was added dropwise with external cooling to accomplish 75 mol % neutralization. Then, 0.11 g (0.00041 mol) of 2,2'-azobis(2-amidinopropane) dihydrochloride as an azo-based compound and 0.0116 g (0.000067 mol) of ethylene glycol diglycidyl ether as an internal-crosslinking agent were added and dissolved. As a result, a second-stage aqueous monomer solution was prepared.

The atmosphere within the separable flask was cooled. Then, the entire amount of the second-stage aqueous monomer solution was added to the first-stage polymerization slurry, and the atmosphere within the system adjusted to 27° C. was sufficiently replaced with nitrogen. The flask was again immersed in a water bath at 70° C. and heated, and the second-stage polymerization was performed for 30 minutes.

After the second-stage polymerization, the reaction mixture in the flask was heated in an oil bath at 125° C. to distill 208 g of water out of the system while refluxing n-heptane into the system by azeotropic distillation of water and n-heptane. Then, 4.42 g (0.51 mmol) of a 2% by mass aqueous solution of ethylene glycol diglycidyl ether as a post-crosslinking agent was added, and the mixture was kept at 80° C. for 120 minutes. Subsequently, n-heptane was evaporated, and the mixture was dried to obtain a resin powder. The resin powder was passed through a sieve with a mesh size of 850 μm to obtain 238.0 g of a water-absorbent resin with a median particle diameter of 390 μm in which spherical particles were aggregated.

Example 2

A 2-L cylindrical round-bottomed separable flask having an inside diameter of 110 mm, and equipped with a reflux condenser, a dropping funnel, a nitrogen gas inlet tube, and a stirrer having stirring blades composed of two sets of four inclined paddle blades with a blade diameter of 50 mm was prepared. This flask was charged with 300 g of n-heptane as a hydrocarbon dispersion medium, and then 0.74 g of a sucrose stearate having an HLB of 3 (Ryoto sugar ester S-370 from Mitsubishi-Kagaku Foods Corporation) as a surfactant and 0.74 g of a maleic anhydride-modified ethylene-propylene copolymer (Hi-wax 1105A from Mitsui Chemicals, Inc.) as a polymeric dispersion agent were added thereto. The mixture was heated with stirring to 80° C. to dissolve the surfactant, and then cooled to 50° C.

Separately, 92 g (1.02 mol) of an 80% by mass aqueous solution of acrylic acid was placed in a 500-mL Erlenmeyer flask, and 146.0 g of a 21% by mass aqueous solution of sodium hydroxide was added dropwise with external cooling to accomplish 75 mol % neutralization. Then, 0.092 g of hydroxyethylcellulose (HEC AW-15F from Sumitomo Seika Chemicals Co. Ltd.) as a thickener, 0.11 g (0.00041 mol) of 2,2'-azobis(2-amidinopropane) dihydrochloride as an azo-based compound, and 0.0064 g (0.000037 mol) of ethylene glycol diglycidyl ether as an internal-crosslinking agent were added and dissolved. As a result, an aqueous monomer solution was prepared.

The rotation speed of the stirrer was adjusted to 600 rpm. Then, the aqueous monomer solution prepared as described above was added into the separable flask, and the atmosphere within the system was sufficiently replaced with nitrogen. The flask was subsequently immersed in a water bath at 70° C. and heated to start polymerization. Next, at the time when the temperature within the system had reached a peak temperature (80 to 90° C.) of polymerization, the rotation speed of the stirrer was changed to 1000 rpm, and in an oil bath at 125° C., 46 g of water was distilled out of the system while refluxing n-heptane into the system by azeotropic distillation of water and n-heptane, so that first-stage polymerization slurry was obtained.

Separately, 128.8 g (1.43 mol) of an 80% by mass aqueous solution of acrylic acid was placed in another 500-mL Erlenmeyer flask, and 159.0 g of a 27% by mass aqueous solution of sodium hydroxide was added dropwise with external cooling to accomplish 75 mol % neutralization. Then, 0.11 g (0.00041 mol) of 2,2'-azobis(2-amidinopropane) dihydrochloride as an azo-based compound and 0.0116 g (0.000067 mol) of ethylene glycol diglycidyl ether as an internal-crosslinking agent were added and dissolved. As a result, a second-stage aqueous monomer solution was prepared.

The atmosphere within the separable flask was cooled. Then, the entire amount of the second-stage aqueous monomer solution was added to the first-stage polymerization slurry, and the atmosphere within the system adjusted to 26° C. was sufficiently replaced with nitrogen. The flask was again immersed in a water bath at 70° C. and heated, and the second-stage polymerization was performed for 30 minutes.

After the second-stage polymerization, the reaction mixture in the flask was heated in an oil bath at 125° C. to distill 192 g of water out of the system while refluxing n-heptane into the system by azeotropic distillation of water and n-heptane. Then, 4.42 g (0.51 mmol) of a 2% by mass aqueous solution of ethylene glycol diglycidyl ether as a post-crosslinking agent was added, and the mixture was kept at 80° C. for 120 minutes. Subsequently, n-heptane was evaporated, and the mixture was dried to obtain a resin powder. The resin powder was passed through a sieve with a mesh size of 850 μm to obtain 235.0 g of a water-absorbent resin with a median particle diameter of 390 μm in which spherical particles were aggregated.

Example 3

A cylindrical round-bottomed separable flask having an inside diameter of 100 mm, and equipped with a reflux condenser, a dropping funnel, a nitrogen gas inlet tube, and a stirrer having stirring blades (with a surface coated with a fluororesin) composed of two sets of four inclined paddle blades with a blade diameter of 50 mm was prepared. 479 g of n-heptane was charged into the flask, and 1.10 g of hexaglycerol diester (Sakamoto Yakuhin kogyo Co., Ltd., SY-Glyster SS-5S) having an HLB of 9.6 was added thereto as a surfactant. The contents were heated to 50° C. so that the surfactant was dissolved therein, and then the temperature was cooled to 40° C.

Separately, 92 g (1.03 mol) of a 80.5% by mass acrylic acid aqueous solution was placed in a 500-mL Erlenmeyer flask, 147.7 g of a 20.9% by mass sodium hydroxide aqueous solution was added dropwise with ice cooling to accomplish 75 mol % neutralization. Then, 0.10 g (0.00037 mol) of potassium persulfate was added and dissolved therein, thereby preparing an aqueous monomer solution. The rotation speed of the stirrer was adjusted to 900 rpm. Then, the aqueous monomer solution was added into the separable flask, and the atmosphere within the system was sufficiently replaced with nitrogen. The flask was subsequently immersed in a water bath at 70° C., and polymerization reaction was carried out for one hour to obtain a polymerization slurry.

Next, after the rotation speed of the stirrer was changed to 1000 rpm, the reaction mixture in the flask was heated in an oil bath at 125° C. to distill 90 g of water out of the system while refluxing n-heptane into the system by azeotropic distillation of water and n-heptane. Then, 4.14 g (0.00048 mol) of a 2% by mass ethylene glycol diglycidyl ether as a post-crosslinking agent was added, and the mixture was kept at 80° C. for 120 minutes. Subsequently, n-heptane was evaporated, and the mixture was dried to obtain a resin powder. The resin powder was passed through a sieve with a mesh size of 850 μm to obtain 90.7 g of a granular water-absorbent resin. The median particle diameter of the obtained water-absorbent resin was 360 μm.

Comparative Example 1

A 2-L cylindrical round-bottomed separable flask having an inside diameter of 110 mm, and equipped with a reflux condenser, a dropping funnel, a nitrogen gas inlet tube, and a stirrer having stirring blades composed of two sets of four inclined paddle blades with a blade diameter of 50 mm was prepared. This flask was charged with 300 g of n-heptane as a hydrocarbon dispersion medium, and then 0.74 g of a sucrose stearate having an HLB of 3 (Ryoto sugar ester S-370 from Mitsubishi-Kagaku Foods Corporation) as a surfactant and 0.74 g of a maleic anhydride-modified ethylene-propylene copolymer (Hi-wax 1105A from Mitsui Chemicals, Inc.) as a polymeric dispersion agent were added thereto. The mixture was heated with stirring to 80° C. to dissolve the surfactant, and then cooled to 50° C.

Separately, 92 g (1.02 mol) of an 80% by mass aqueous solution of acrylic acid was placed in a 500-mL Erlenmeyer flask, and 146.0 g of a 21% by mass aqueous solution of sodium hydroxide was added dropwise with external cooling to accomplish 75 mol % neutralization. Then, 0.092 g of hydroxyethylcellulose (HEC AW-15F from Sumitomo Seika Chemicals Co. Ltd.) as a thickener, 0.11 g (0.00041 mol) of 2,2'-azobis(2-amidinopropane) dihydrochloride as an azo-based compound, and 0.0064 g (0.000037 mol) of ethylene glycol diglycidyl ether as an internal-crosslinking agent were added and dissolved. As a result, an aqueous monomer solution was prepared.

The rotation speed of the stirrer was adjusted to 500 rpm. Then, the aqueous monomer solution prepared as described above was added into the separable flask, and the atmosphere within the system was sufficiently replaced with nitrogen. The flask was subsequently immersed in a water bath at 70° C. and heated to start polymerization. Next, at the time when the temperature within the system had reached a peak temperature (80 to 90° C.) of polymerization, the water bath was adjusted to 80° C., and the reaction mixture was heated for 60 minutes. As a result, first-stage polymerization slurry was obtained. Separately, 128.8 g (1.43 mol) of an 80% by mass aqueous solution of acrylic acid was placed in another 500-mL Erlenmeyer flask, and 159.0 g of a 27% by mass aqueous solution of sodium hydroxide was added dropwise with external cooling to accomplish 75 mol % neutralization. Then, 0.129 g (0.475 mmol) of 2,2'-azobis(2-amidinopropane) dihydrochloride as an azo-based compound and 0.0116 g (0.067 mmol) of ethylene glycol diglycidyl ether as an internal-crosslinking agent were added and dissolved. As a result, a second-stage aqueous monomer solution was prepared.

The rotation speed of the stirrer was changed to 1000 rpm, and then the atmosphere within the separable flask was cooled. The entire amount of the second-stage aqueous monomer solution was added to the first-stage polymerization slurry, and the atmosphere within the system adjusted to 27° C. was sufficiently replaced with nitrogen. The flask was again immersed in a water bath at 70° C. and heated, and the second-stage polymerization was performed for 30 minutes. After the second-stage polymerization, the reaction mixture in the flask was heated in an oil bath at 125° C. to distill 249 g of water out of the system while refluxing n-heptane by azeotropic distillation of water and n-heptane. Then, 4.42 g (0.51 mmol) of a 2% by mass aqueous solution of ethylene glycol diglycidyl ether as a post-crosslinking agent was added, and the mixture was kept at 80° C. for 120 minutes. Subsequently, n-heptane was evaporated, and the mixture was dried to obtain a resin powder. The resin powder was passed through a sieve with a mesh size of 850 μm to obtain 241.0 g of a water-absorbent resin with a median particle diameter of 390 μm in which spherical particles were aggregated.

Comparative Example 2

A 2-L cylindrical round-bottomed separable flask having an inside diameter of 110 mm, and equipped with a flux condenser, a dropping funnel, a nitrogen gas inlet tube, and a stirrer having stirring blades composed of two sets of four inclined paddle blades with a blade diameter of 50 mm was prepared. This flask was charged with 300 g of n-heptane as a hydrocarbon dispersion medium, and then 0.74 g of a sucrose stearate having an HLB of 3 (Ryoto sugar ester S-370 from Mitsubishi-Kagaku Foods Corporation) as a surfactant and 0.74 g of a maleic anhydride-modified ethylene-propylene copolymer (Hi-wax 1105A from Mitsui Chemicals, Inc.) as a polymeric dispersion agent were added thereto. The mixture was heated with stirring to 80° C. to dissolve the surfactant, and then cooled to 50° C.

Separately, 92 g (1.02 mol) of an 80% by mass aqueous solution of acrylic acid was placed in a 500-mL Erlenmeyer flask, and 146.0 g of a 21% by mass aqueous solution of sodium hydroxide was added dropwise with external cooling to accomplish 75 mol % neutralization. Then, 0.092 g of hydroxyethylcellulose (HEC AW-15F from Sumitomo Seika Chemicals Co. Ltd.) as a thickener, 0.11 g (0.00041 mol) of 2,2'-azobis(2-amidinopropane) dihydrochloride as an azo-based compound, and 0.0064 g (0.000037 mol) of ethylene glycol diglycidyl ether as an internal-crosslinking agent were added and dissolved. As a result, an aqueous monomer solution was prepared.

The rotation speed of the stirrer was adjusted to 600 rpm. Then, the aqueous monomer solution prepared as described above was added into the separable flask, and the atmosphere within the system was sufficiently replaced with nitrogen. The flask was subsequently immersed in a water bath at 70° C. and heated to start polymerization. Next, at the time when the temperature within the system had reached a peak temperature (80 to 90° C.) of polymerization, the water bath was adjusted to 80° C., and the reaction mixture was heated for 60 minutes. As a result, first-stage polymerization slurry was obtained.

Separately, 128.8 g (1.43 mol) of an 80% by mass aqueous solution of acrylic acid was placed in another 500-mL Erlenmeyer flask, and 159.0 g of a 27% by mass aqueous solution of sodium hydroxide was added dropwise with external cooling to accomplish 75 mol % neutralization. Then, 0.129 g (0.475 mmol) of 2,2'-azobis(2-amidinopropane) dihydrochloride as an azo-based compound and 0.0116 g (0.067 mmol) of ethylene glycol diglycidyl ether as an internal-crosslinking agent were added and dissolved. As a result, a second-stage aqueous monomer solution was prepared.

The rotation speed of the stirrer was changed to 1000 rpm, and then the atmosphere within the separable flask was cooled. The entire amount of the second-stage aqueous monomer solution was added to the first-stage polymerization slurry, and the atmosphere within the system adjusted to 27° C. was sufficiently replaced with nitrogen. The flask was again immersed in a water bath at 70° C. and heated, and the second-stage polymerization was performed for 30 minutes. After the second-stage polymerization, the reaction mixture in the flask was heated in an oil bath at 125° C. to distill 224 g of water out of the system while refluxing n-heptane into the system by azeotropic distillation of water and n-heptane. Then, 4.42 g (0.51 mmol) of a 2% by mass aqueous solution of ethylene glycol diglycidyl ether as a post-crosslinking agent was added, and the mixture was kept at 80° C. for 120 minutes. Subsequently, n-heptane was evaporated, and the mixture was dried to obtain a resin powder. The resin powder was passed through a sieve with a mesh size of 850 μm to obtain 239.0 g of a water-absorbent resin with a median particle diameter of 390 μm in which spherical particles were aggregated.

Comparative Example 3

A 2-L cylindrical round-bottomed separable flask having an inside diameter of 110 mm, and equipped with a reflux condenser, a dropping funnel, and a stirrer having stirring blades composed of four inclined paddle blades with a blade diameter of 50 mm was prepared. This flask was charged with 195.4 g (2.71 mol) of acrylic acid, then 135.1 g of ion-exchanged water was added while stirring the inside of the flask, and 357.9 g of 30% by mass sodium hydroxide was added dropwise with external cooling Thereafter, 104.7 g (1.45 mol) of acrylic acid was added to prepare a partially neutralized acrylic acid solution having a degree of neutralization of 65 mol %.

43.7 g of an aqueous solution of 2% polyethylene glycol diacrylate (average repeating unit of ethylene oxide: 9) as an internal-crosslinking agent solution and 180.9 g of ion-exchanged water were mixed with 780 g of the above partially neutralized acrylic acid solution having a degree of neutralization of 65 mol % to prepare an aqueous monomer solution.

The aqueous monomer solution was weighed in an amount of 745.5 g in a vat (made of stainless steel: diameter 188 mm, height 60 mm), and nitrogen was blown such that dissolved oxygen in the solution was 0.1 ppm or less.

Subsequently, the temperature of the above aqueous solution was adjusted to 18° C. under a nitrogen atmosphere, and then 1.19 g (0.25 mmol) of a 5% by mass aqueous solution of sodium persulfate, 1.19 g (0.22 mmol) of a 5% by mass aqueous solution of 2,2'-azobis(2-amidinopropane) dihydrochloride, 1.12 g (0.032 mmol) of 0.5% by mass aqueous scorbic acid solution, and 1.27 g (0.13 mmol) of 0.35% by mass aqueous hydrogen peroxide solution were sequentially added under stirring.

Polymerization started immediately after addition of hydrogen peroxide, and after 9 minutes, the temperature of the monomer reached the peak temperature. The peak temperature was 89° C. Subsequently, the vat was immersed in a water bath at 80° C. and heated for 10 minutes to obtain a clear hydrous gel.

The hydrous gel was crushed by a 1 L double-arm kneader (IRIE SHOKAI Co., Ltd., tabletop kneader PNV-1), and then dried at 180° C. for 30 minutes to obtain a dried product. The dried product was pulverized by a pulverizer (Retsch Gmbh & Co. Kg, Rotor beater mill SR300), and particles remaining on a sieve with a mesh size of 106 μm that passed through a sieve with a mesh size of 500 μm were classified to obtain 716 g of resin powder.

30 g of the resin powder obtained above was mixed with a composition comprising 0.015 g (0.086 mmol) of ethylene glycol diglycidyl ether, 0.3 g (3.94 mmol) of propylene glycol, 0.9 g of water and 0.3 g (4.99 mmol) of isopropyl alcohol and then held at 180° C. for 40 minutes to obtain 28.9 g of a water-absorbent resin having a median particle diameter of 320 μm.

Comparative Example 4

A 2-L cylindrical round-bottomed separable flask having an inside diameter of 110 mm, and equipped with a flux condenser, a dropping funnel, a nitrogen gas inlet tube, and a stirrer having stirring blades composed of two sets of four inclined paddle blades with a blade diameter of 50 mm was prepared. This flask was charged with 300 g of n-heptane as a hydrocarbon dispersion medium, and then 0.74 g of a sucrose stearate having an HLB of 3 (Ryoto sugar ester S-370 from Mitsubishi-Kagaku Foods Corporation) as a surfactant and 0.74 g of a maleic anhydride-modified ethylene-propylene copolymer (Hi-wax 1105A from Mitsui Chemicals, Inc.) as a polymeric dispersion agent were added thereto. The mixture was heated with stirring to 80° C. to dissolve the surfactant, and then cooled to 50° C.

Separately, 92 g (1.02 mol) of an 80% by mass aqueous solution of acrylic acid was placed in a 500-mL Erlenmeyer flask, and 146.0 g of a 21% by mass aqueous solution of sodium hydroxide was added dropwise with external cooling to accomplish 75 mol % neutralization. Then, 0.092 g of hydroxyethylcellulose (HEC AW-15F from Sumitomo Seika Chemicals Co. Ltd.) as a thickener, 0.11 g (0.00041 mol) of 2,2'-azobis(2-amidinopropane) dihydrochloride as an azo-based compound, and 0.0064 g (0.000037 mol) of ethylene glycol diglycidyl ether as an internal-crosslinking agent were added and dissolved. As a result, an aqueous monomer solution was prepared.

The rotation speed of the stirrer was adjusted to 500 rpm. Then, the aqueous monomer solution prepared as described above was added into the separable flask, and the atmosphere within the system was sufficiently replaced with nitrogen. The flask was subsequently immersed in a water bath at 70° C. and heated to start polymerization. Next, at the time when the temperature within the system had reached a peak temperature (80 to 90° C.) of polymerization, the rotation speed of the stirrer was changed to 1000 rpm, and in an oil bath at 125° C., 69 g of water was distilled out of the system while refluxing n-heptane into the system by azeotropic distillation of water and n-heptane, so that first-stage polymerization slurry was obtained.

Separately, 128.8 g (1.43 mol) of an 80% by mass aqueous solution of acrylic acid was placed in another 500-mL Erlenmeyer flask, and 159.0 g of a 27% by mass aqueous solution of sodium hydroxide was added dropwise with external cooling to accomplish 75 mol % neutralization. Then, 0.11 g (0.00041 mol) of 2,2'-azobis(2-amidinopropane) dihydrochloride as an azo-based compound and 0.0116 g (0.000067 mol) of ethylene glycol diglycidyl ether as an internal-crosslinking agent were added and dissolved. As a result, a second-stage aqueous monomer solution was prepared.

The atmosphere within the separable flask was cooled. Then, the entire amount of the second-stage aqueous monomer solution was added to the first-stage polymerization slurry, and the atmosphere within the system adjusted to 26° C. was sufficiently replaced with nitrogen. The flask was again immersed in a water bath at 70° C. and heated, and the second-stage polymerization was performed for 30 minutes.

After the second-stage polymerization, the reaction mixture in the flask was heated in an oil bath at 125° C. to distill 166 g of water out of the system while refluxing n-heptane into the system by azeotropic distillation of water and n-heptane. Then, 4.42 g (0.51 mmol) of a 2% by mass aqueous solution of ethylene glycol diglycidyl ether as a post-crosslinking agent was added, and the mixture was kept at 80° C. for 120 minutes. Subsequently, n-heptane was evaporated, and the mixture was dried to obtain a resin powder. The resin powder was passed through a sieve with a mesh size of 850 μm to obtain 236.0 g of a water-absorbent resin with a median particle diameter of 390 μm in which spherical particles were aggregated.

Table 1 shows the results of evaluation of the water-absorbent resins produced in the examples and comparative examples, using the testing methods for evaluation described above.

TABLE 1

| | Cavity area ratio (%) | Physiological-saline absorption capacity (g/g) | Water suction height (mm) | | Water suction elongation (%) |
|---|---|---|---|---|---|
| | | | After 5 min. | After 60 min. | |
| Example 1 | 11 | 52 | 70 | 80 | 14 |
| Example 2 | 20 | 50 | 76 | 89 | 17 |
| Example 3 | 32 | 45 | 80 | 95 | 19 |

TABLE 1-continued

|  | Cavity area ratio (%) | Physiological-saline absorption capacity (g/g) | Water suction height (mm) After 5 min. | Water suction height (mm) After 60 min. | Water suction elongation (%) |
|---|---|---|---|---|---|
| Comparative Example 1 | 3 | 64 | 55 | 55 | 0 |
| Comparative Example 2 | 6 | 48 | 65 | 65 | 0 |
| Comparative Example 3 | 1 | 55 | 40 | 40 | 0 |
| Comparative Example 4 | 8 | 51 | 70 | 74 | 6 |

As is clear from the results shown in Table 1, in the water-absorbent resins of Examples 1 to 3 in which the physiological-saline absorption capacity is 40 to 60 g/g and the ratio of the area of cavity portions (cavity area ratio) calculated by Equation (I) is 10% or more, the water suction height and the water suction elongation are high, and the water-absorbent resins quickly absorb water, do not easily form unswollen lumps, and have a high gel swelling volume when water is used to swell the water-absorbent resins.

DESCRIPTION OF REFERENCE SIGNS

10: Sample stage
11: Water-absorbent resin
w: Particle length

The invention claimed is:

1. A water-absorbent resin comprising a polymer of a water-soluble ethylenically unsaturated monomer, wherein:
a physiological-saline absorption capacity is 40 to 60 g/g, and
when a cross-sectional image of the water-absorbent resin obtained by X-ray computed tomography is observed, a ratio (cavity area ratio) as calculated by Equation (I) of an area of cavity portions in the cross-sectional image is 10% or more:

cavity area ratio [%]={total cross-sectional area (B) of cavity portions in the water-absorbent resin/ (total cross-sectional area (A) of resin portions in the water-absorbent resin+total cross-sectional area (B) of cavity portions in the water-absorbent resin)}×100         (I).

2. The water-absorbent resin according to claim 1, wherein the water-absorbent resin has a granular shape, a substantially spherical shape, or a shape in which particles having a substantially spherical shape are aggregated.

3. The water-absorbent resin according to claim 1, wherein a cavity area ratio of the water-absorbent resin is 10 to 50%.

4. The water-absorbent resin according to claim 1, wherein a suction height after 5 minutes measured by a water suction test is 70 mm or more, wherein the water suction test is performed by:
(a) obtaining a fraction of the water-absorbent resin that passes through a sieve with a mesh size of 600 μm but is retained by a sieve with a mesh size of 300 μm,
(b) placing a glass filter with an outside diameter of 80 mm and a thickness of 5 mm in a Petri dish with an inside diameter of 150 mm and a height of 30 mm,
(c) pouring distilled water to the height of the glass filter, and placing a filter paper thereon,
(d) dispersing 1 g of the fraction of the water-absorbent resin uniformly on a bottom of a cylinder with an inside diameter of 25 mm and a height of 150 mm, in which a stainless steel mesh of 400 mesh is attached to the bottom, and placed on the filter paper, and
(e) measuring, a height (mm) of the water-absorbent resin swollen by absorbing water after 5 minutes.

5. The water-absorbent resin according to claim 4, wherein in the water suction test, after 5 minutes and 60 minutes, the height of the water-absorbent resin swollen by absorbing water is measured, and a suction elongation calculated by Equation (II) is 10% or more:
(II) suction elongation [%]=[(suction height after 60 minutes/suction height after 5 minutes)−1]×100.

6. A sandbag comprising the water-absorbent resin according to claim 1.

7. The water-absorbent resin according to claim 2, wherein a cavity area ratio of the water-absorbent resin is 10 to 50%.

8. The water-absorbent resin according to claim 2, wherein a suction height after 5 minutes measured by a water suction test is 70 mm or more, wherein the water suction test is performed by:
(a) obtaining a fraction of the water-absorbent resin that passes through a sieve with a mesh size of 600 μm but is retained by a sieve with a mesh size of 300 μm,
(b) placing a glass filter with an outside diameter of 80 mm and a thickness of 5 mm in a Petri dish with an inside diameter of 150 mm and a height of 30 mm,
(c) pouring distilled water to the height of the glass filter, and placing a filter paper thereon,
(d) dispersing 1 g of the fraction of the water-absorbent resin uniformly on a bottom of a cylinder with an inside diameter of 25 mm and a height of 150 mm, in which a stainless steel mesh of 400 mesh is attached to the bottom, and placed on the filter paper, and
(e) measuring, a height (mm) of the water-absorbent resin swollen by absorbing water after 5 minutes.

9. The water-absorbent resin according to claim 3, wherein a suction height after 5 minutes measured by a water suction test is 70 mm or more, wherein the water suction test is performed by:
(a) obtaining a fraction of the water-absorbent resin that passes through a sieve with a mesh size of 600 μm but is retained by a sieve with a mesh size of 300 μm,
(b) placing a glass filter with an outside diameter of 80 mm and a thickness of 5 mm in a Petri dish with an inside diameter of 150 mm and a height of 30 mm,
(c) pouring distilled water to the height of the glass filter, and placing a filter paper thereon,
(d) dispersing 1 g of the fraction of the water-absorbent resin uniformly on a bottom of a cylinder with an inside diameter of 25 mm and a height of 150 mm, in which a stainless steel mesh of 400 mesh is attached to the bottom, and placed on the filter paper, and
(e) measuring, a height (mm) of the water-absorbent resin swollen by absorbing water after 5 minutes.

10. A sandbag comprising the water-absorbent resin according to claim 2.

11. A sandbag comprising the water-absorbent resin according to claim 3.

12. A sandbag comprising the water-absorbent resin according to claim 4.

13. A sandbag comprising the water-absorbent resin according to claim 5.

* * * * *